(12) United States Patent
Gutstein et al.

(10) Patent No.: US 10,247,374 B2
(45) Date of Patent: *Apr. 2, 2019

(54) ELECTRICALLY ILLUMINATED FLAME SIMULATOR

(71) Applicant: Sterno Home Inc., Vancouver (CA)

(72) Inventors: Robert A. Gutstein, Calabasas, CA (US); Monita Liu, Calabasas, CA (US)

(73) Assignee: STERNO HOME INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,675

(22) Filed: Jul. 24, 2018

(65) Prior Publication Data

US 2018/0328556 A1  Nov. 15, 2018

Related U.S. Application Data

(63) Continuation of application No. 15/346,475, filed on Nov. 8, 2016, now Pat. No. 10,036,521, which is a
(Continued)

(51) Int. Cl.
*F21S 10/04* (2006.01)
*F21S 6/00* (2006.01)
(Continued)

(52) U.S. Cl.
CPC .............. *F21S 10/04* (2013.01); *F21S 6/001* (2013.01); *F21S 9/02* (2013.01); *F21S 9/022* (2013.01);
(Continued)

(58) Field of Classification Search
CPC .... F21S 10/04; F21S 6/001; F21S 9/02; F21S 9/022; F21V 23/04; F21V 23/0442;
(Continued)

(56) References Cited

U.S. PATENT DOCUMENTS 1,831,902 A   11/1931   Brown
2,080,259 A    5/1937   Frei
(Continued)

FOREIGN PATENT DOCUMENTS

CA    1206196    6/1986
CA    1224242    7/1987
(Continued)

OTHER PUBLICATIONS

Reply Brief Filed Applicant in U.S. Appl. No. 90/010,980, filed Jun. 18, 2012.
(Continued)

*Primary Examiner* — Andrew J Coughlin
*Assistant Examiner* — Meghan K Ulanday
(74) *Attorney, Agent, or Firm* — McAndrews, Held & Malloy, Ltd.

(57) ABSTRACT

An electrically powered flame simulator comprises at least two light sources, an integrated circuit electrically connected to the light sources for intermittently illuminating at least one of the light sources independently of other light sources such that the light sources together provide the effect of a flickering movement, and a power source for providing power to the integrated circuit. The flame simulator may be mounted in a decorative or ornamental device such as a candle or fire log, or used on decorative clothing, or may be part of a hazard or warning system. One or more solid state light sources may also be used.

10 Claims, 3 Drawing Sheets

Related U.S. Application Data continuation of application No. 14/848,714, filed on Sep. 9, 2015, now Pat. No. 9,491,832, which is a continuation of application No. 14/623,308, filed on Feb. 16, 2015, now abandoned, which is a continuation of application No. 14/055,544, filed on Oct. 16, 2013, now Pat. No. 8,998,461, which is a continuation of application No. 13/449,100, filed on Apr. 17, 2012, now Pat. No. 8,562,186, which is a continuation of application No. 12/927,645, filed on Nov. 19, 2010, now Pat. No. 8,157,425, which is a continuation of application No. 12/586,933, filed on Sep. 30, 2009, now abandoned, which is a continuation of application No. 12/284,986, filed on Sep. 26, 2008, now abandoned, which is a continuation of application No. 11/881,303, filed on Jul. 26, 2007, now abandoned, which is a continuation of application No. 11/494,812, filed on Jul. 28, 2006, now abandoned, which is a continuation of application No. 10/822,392, filed on Apr. 12, 2004, now abandoned, which is a continuation of application No. 10/084,272, filed on Feb. 27, 2002, now Pat. No. 6,719,443.

(51) Int. Cl.
| | | |
|---|---|---|
| *F21S 9/02* | (2006.01) | |
| *F21V 23/04* | (2006.01) | |
| *F21V 23/06* | (2006.01) | |
| *F21V 33/00* | (2006.01) | |
| *F21V 35/00* | (2006.01) | |
| *H04R 1/02* | (2006.01) | |
| *H05B 33/08* | (2006.01) | |
| *H05B 37/02* | (2006.01) | |
| *F21W 121/00* | (2006.01) | |
| *F21Y 115/10* | (2016.01) | |
| *F21Y 101/00* | (2016.01) | |

(52) U.S. Cl.
CPC .......... *F21V 23/04* (2013.01); *F21V 23/0442* (2013.01); *F21V 23/06* (2013.01); *F21V 33/0028* (2013.01); *F21V 35/00* (2013.01); *H04R 1/028* (2013.01); *H05B 33/0845* (2013.01); *H05B 33/0854* (2013.01); *H05B 37/02* (2013.01); *H05B 37/0236* (2013.01); *F21W 2121/00* (2013.01); *F21Y 2101/00* (2013.01); *F21Y 2115/10* (2016.08); *Y10S 362/80* (2013.01); *Y10S 362/81* (2013.01); *Y10S 362/812* (2013.01)

(58) Field of Classification Search
CPC ...... F21V 23/06; F21V 33/0028; F21V 35/00; H04R 1/028; H05B 33/0845; H05B 33/0854; H05B 37/02; H05B 37/0236
USPC ........................................................ 362/307
See application file for complete search history.

(56) References Cited

U.S. PATENT DOCUMENTS

| | | |
|---|---|---|
| 2,164,378 A | 7/1939 | Berwick |
| 2,196,509 A | 4/1940 | Turner |
| 2,234,903 A | 3/1941 | Muench |
| 2,308,738 A | 1/1943 | Melvin |
| 2,435,811 A | 2/1948 | Waters |
| 2,584,563 A | 2/1952 | Duncan |
| 2,611,254 A | 9/1952 | Byrnes |
| 3,127,539 A | 3/1964 | Convertine |
| 3,145,323 A | 8/1964 | Elotz |
| 3,194,955 A | 7/1965 | Koch |
| 3,233,093 A | 2/1966 | Gerlat |
| 3,413,458 A | 11/1968 | Barefoot |
| 3,435,286 A | 3/1969 | Kayatt |
| 3,495,128 A | 2/1970 | Gresham |
| 3,500,126 A | 3/1970 | Ford |
| 3,684,882 A | 8/1972 | Mininno |
| 3,748,464 A | 7/1973 | Andeweg |
| 3,749,904 A | 7/1973 | Graff |
| 3,761,702 A | 9/1973 | Andeweg |
| 3,762,857 A | 10/1973 | Andeweg |
| 3,797,990 A | 3/1974 | Rogers et al. |
| 3,873,880 A | 3/1975 | Riddell |
| 3,890,085 A | 6/1975 | Andeweg |
| 3,907,245 A | 9/1975 | Linder |
| 4,064,414 A | 12/1977 | Bergeson |
| 4,114,842 A | 9/1978 | Hofferber et al. |
| 4,159,442 A | 6/1979 | Komatsu |
| 4,260,365 A | 4/1981 | Kayne |
| 4,477,249 A | 10/1984 | Ruzek |
| 4,492,896 A | 1/1985 | Jullien |
| 4,510,556 A | 4/1985 | Johnson |
| 4,567,548 A | 1/1986 | Schneeberger |
| 4,593,232 A | 6/1986 | McEdwards |
| 4,617,614 A | 10/1986 | Lederer |
| 4,839,784 A | 6/1989 | Lin |
| 4,866,580 A | 9/1989 | Blakerby |
| 4,870,325 A | 9/1989 | Kazar |
| 5,097,180 A | 3/1992 | Ignon et al. |
| 5,152,602 A | 10/1992 | Boschetto |
| 5,174,645 A | 12/1992 | Chung |
| 5,276,595 A | 1/1994 | Patrie |
| 5,600,209 A | 2/1997 | St. Louis |
| D380,855 S | 7/1997 | Arshad |
| 5,658,073 A | 8/1997 | Lee |
| 5,863,108 A | 1/1999 | Lederer |
| 5,879,076 A | 3/1999 | Cross |
| 5,924,784 A | 7/1999 | Chliwnyj |
| 5,980,064 A | 11/1999 | Metroyanis |
| 6,017,139 A | 1/2000 | Lederer |
| 6,053,622 A | 4/2000 | Horowitz et al. |
| 6,066,924 A | 5/2000 | Lederer |
| 6,102,548 A | 8/2000 | Mantle |
| 6,106,294 A | 8/2000 | Daniel |
| D432,258 S | 10/2000 | Fussell |
| 6,196,706 B1 | 3/2001 | Cutts |
| 6,198,229 B1 | 3/2001 | McCloud |
| 6,218,785 B1 | 4/2001 | Incerti |
| 6,234,652 B1 | 5/2001 | Tang |
| 6,241,362 B1 | 6/2001 | Morrison |
| 6,280,053 B1 | 8/2001 | Chien |
| 6,309,092 B1 | 10/2001 | Bardeen |
| 6,520,770 B2 | 2/2003 | Zou |
| 6,522,210 B1 | 2/2003 | Dvorak |
| 6,575,613 B2 | 6/2003 | Brown |
| 6,616,308 B2 | 9/2003 | Jensen |
| 6,719,443 B2 | 4/2004 | Gutstein et al. |
| 8,562,186 B2 | 10/2013 | Gutstein et al. |
| 8,858,043 B2 | 10/2014 | Gutstein |
| 10,036,521 B2 * | 7/2018 | Gutstein ................. F21S 6/001 |
| 2001/0033488 A1 | 10/2001 | Chiwnyj |
| 2002/0080604 A1 | 6/2002 | Niermann |
| 2002/0093834 A1 | 7/2002 | Yu |
| 2002/0191404 A1 | 12/2002 | Clift |
| 2003/0035291 A1 | 2/2003 | Jensen |
| 2003/0053305 A1 | 3/2003 | Lin |
| 2004/0252498 A1 | 12/2004 | Gutstein et al. |
| 2007/0002560 A1 | 1/2007 | Gutstein et al. |
| 2007/0014107 A1 | 1/2007 | Mishan |
| 2007/0236947 A1 | 10/2007 | Jensen |
| 2009/0097237 A1 | 4/2009 | Gutstein et al. |
| 2010/0134022 A1 | 6/2010 | Gutstein et al. |
| 2016/0047517 A1 | 12/2016 | Li |

FOREIGN PATENT DOCUMENTS

| | | |
|---|---|---|
| CA | 2117170 | 7/1995 |
| CA | 2262338 | 8/2000 |
| DE | G9307061.6 | 10/1993 |
| DE | 19734345 A1 | 2/1999 |

(56) References Cited

FOREIGN PATENT DOCUMENTS

| EP | 0600217 | 6/1994 |
|---|---|---|
| EP | 0876085 | 1/1998 |
| EP | 0916892 | 5/1999 |
| FR | 2788101 | 7/2000 |
| GB | 191224971 | 12/1913 |
| GB | 499745 | 1/1939 |
| GB | 588801 | 6/1947 |
| GB | 2103777 | 2/1983 |
| WO | 1982002756 | 8/1982 |
| WO | 29609043 U1 | 8/1996 |
| WO | 1996025624 | 8/1996 |
| WO | 1997028671 | 8/1997 |
| WO | 1999031560 | 6/1999 |
| WO | 2000019143 | 4/2000 |
| WO | 2001061854 | 8/2001 |
| WO | 01/74120 A1 | 10/2001 |

OTHER PUBLICATIONS

Request for Reexamination in U.S. Appl. No. 90/010,980, filed May 5, 2010.
Texas Instruments, SN54HC14, SN711C14 Hex Schmitt—Trigger Inverters, 1997.
Transcript of Hearing in U.S. Appl. No. 90/010,980, filed Dec. 10, 2012.
European Patent Office, Communication with extended European search report, in Application No. 11192460.1, dated Sep. 23, 2014 (9 pages).
"Declaration of Donna Baker Schwenk," dated Oct. 26, 2010, Civil Action No. 1:09-cv-07807 Document #: 76, filed Oct. 27, 2010, PageID #:1258, p. 1-9.
"Defendant Valuevision Media, Inc.'s Reply Claim Construction Brief" of the '443 Patent, signed by Paul E Crawford, Cvil Action No. 1:09-cv-07807 Document #:87, filed Nov. 11, 2010, Page ID # 1377, pp. 1-13.
"Exhibit A" of the Declaration of Donna Baker Schwenk, dated Oct. 26, 2010, Civil Action No. 1:09-cv-07807 Document #: 76-1, filed Oct. 27, 2010, PageID #:1267, p. 1-7.
"Exhibit B" of the Declaration of Donna Baker Schwenk, dated Oct. 26, 2010, Civil Action No. 1:09-cv-07807 Document #: 76-2, filed Oct. 27, 2010, PageID #:1274, p. 1-3.
"Plaintiff Winvic's Responsive Claim Construction Brief" fo the '443 Patent, signed by Christopher V. Carani, Civil Action No. 1:09-cv-07807 Document #: 75, filed Oct. 27, 2010, PageID #: 1229, pp. 1-29.
"Winvic Sales Inc's Appendix to Claim Construction Brief," Civil Action No. 1:09-cv-07807 Document #: 77, filed Oct. 28, 2010, PageID #:1277, p. 1-34.
Jan. 11, 2010, *Winvic v. Enchanted Enjoy* (09-6355), Defendant's Initial Non-Infringement, Unenforceability and Invalidity contentions Under LPR 2.3.
Jan. 25, 2010, *Winvic v. Enchanted Enjoy* (09-6355), Plaintiff's Initial Response to Def's Initial Invalidity Contentions Under LPR 2.5.
Mar. 3, 2010, *Winvic v. ShopNBC* (09-07807), ValueVision Media's Initial Non-Infringement and Invalidity Contentions.
Mar. 29, 2010, *Winvic v. ShopNBC* (09-07807), Plaintiff's Initial Response to Def's Initial Invalidity Contentions Under LPR 2.5.
Jul. 6, 2010, *Winvic V. ShopNBC* (09-07807), Def Motion under FRCP 56 for Summary Judgment of Patent Invalidity (doc. No. 36).
Jul. 6, 2010, *Winvic V. ShopNBC* (09-07807), Def ValueVision's LR 56.1 statement of undisputed material facts iso its motion under FRCP 56 (doc. No. 37).
Jul. 6, 2010, *Winvic v. ShopNBC* (09-07807), Def ValueVision's Memorandum ISO its Motion Under Fed.R.Civ.P. 56 for Summary Judgment of Patent Invalidity (doc No. 38).
Jul. 14, 2010, *Winvic V. ShopNBC* (09-07807), ValueVision's final invalidity and unenforceability contentions.

Aug. 11, 2010, *Winvic V. ShopNBC* (09-07807), Plaintiff's Response to Defendant's Final Invalidity Contentions Under LPR 3.2.
Aug. 16, 2010, *Winvic V. ShopNBC* (09-07807), Winvic Sales's Opposition to Def's Motion for Summary Judgment (doc. No. 49).
Aug. 17, 2010, *Winvic v. ShopNBC* (09-07807), Declaration of Bernard Fournier (doc No. 55).
Aug. 17, 2010, *Winvic V. ShopNBC* (09-07807), Declaration of Brianne M. Straka ISO Pltf's Opp'n to Def's Mot for SJ of Patent Invalidity (doc No. 53).
Aug. 17, 2010, *Winvic V. ShopNBC* (09-07807), Declaration of Donna Baker Schwenk (doc No. 57).
Aug. 17, 2010, *Winvic V. ShopNBC* (09-07807), Pltf Winvic's Response to Def, ValueVision's LP 56.1 Statement of Undisputed Material Facts (doc. No. 54).
Aug. 18, 2010, *Winvic V. BBB* et al (09-6364), Minute Entry Dismissing Case.
Aug. 18, 2010, *Winvic v. BBB* et al (09-6364), Stipulated Dismissal with Prejudice (doc No. 67).
Aug. 18, 2010, *Winvic v. Enjoy* (09-6355), Minute Entry Dismissing Case.
Aug. 18, 2010, *Winvic V. Enjoy* (09-6355), Stipulated Dismissal with Prejudice (doc. No. 40).
Aug. 18, 2010, *Winvic v. ShopNBC* (09-07807), Declaration of Matthew Kowalec (doc No. 56).
Aug. 30, 2010, *Winvic v. ShopNBC* (09-07807), Def ValueVision's Reply Memorandum ISO Its Motion for Summary Judgment (doc No. 66).
Aug. 30, 2010, *Winvic v. ShopNBC* (09-07807), Def's Responses to Additional Facts Alleged by Pltf Purs. Local Rule 56.1 (doc No. 67).
Sep. 29, 2010, *Winvic v. ShopNBC* (09-07807), Def Valuevision Media's Opening Claim Construction Brief (doc No. 74).
Amendment/Req. Reconcideration After Non-Final Reject in U.S. Appl. No. 90/010,980 dated May 16, 2011.
Amendment/Req. Reconsideration After Non-Final Reject in U.S. Appl. No. 90/010,980 dated Oct. 18, 2011.
Appeal Brief Filed in U.S. Appl. No. 90/010,980 dated Mar. 19, 2012.
Claim Construction Memorandum and Order, dated Oct. 14, 2011. Winvic Sales, Inc. v. Valuvision Media, Inc., Northern District of Illinois, Eastern Division, 09 C 7807.
Communication transmitting a Partial European Search Report, for Application No. 09004177.3-2423, dated Dec. 15, 2010, pp. 1-6.
Communication transmitting the European Search Report, for Application No. 10011232.5-2423, dated Dec. 15, 2010, pp. 1-5.
Constable, "Candlemarking Creative Designs and Techniques," Search Press, 1992, pp. 18, 37, 49, 54 and 77.
Determination—Reexam Ordered in U.S. Appl. No. 90/010,980 dated May 27, 2010.
EternalLight, Inc., Eternalights, 2999; http://www.eter-nalight.com/faq.htm.
Examiner's Answer to Appeal Brief in U.S. Appl. No. 90/010,980 dated Apr. 16, 2012.
Norex Enterprises, Inc. Electronic Candles and Chargers, published on the internet @ http://www.norex-enterpris-es.com/candle.htm.
Office Action in U.S. Appl. No. 10/084,272 dated May 8, 2003.
Office Action in U.S. Appl. No. 10/822,392 dated May 2, 2006.
Office Action in U.S. Appl. No. 11/494,812 dated Feb. 28, 2007.
Office Action in U.S. Appl. No. 11/811,303 dated Mar. 27, 2008.
Office Action in U.S. Appl. No. 12/284,986 dated Mar. 30, 2009.
Office Action in U.S. Appl. No. 12/586,933 dated May 20, 2010.
Office Action in U.S. Appl. No. 12/927,645 dated May 23, 2011.
Patent Board Decision—Examiner Affirmed in U.S. Appl. No. 90/010,980 dated Mar. 8, 2011.
Reexam—Final Rejection in U.S. Appl. No. 90/010,980 dated Nov. 18, 2011.
Reexam—Non-Final Action in U.S. Appl. No. 90/010,980 dated Mar. 15, 2011.
Reexam—Non-Final Action in U.S. Appl. No. 90/010,980 dated Aug. 16, 2011.

\* cited by examiner

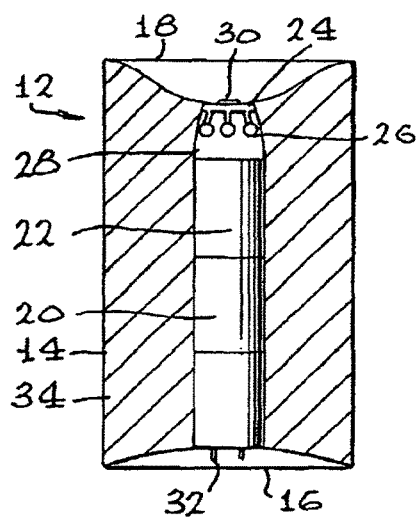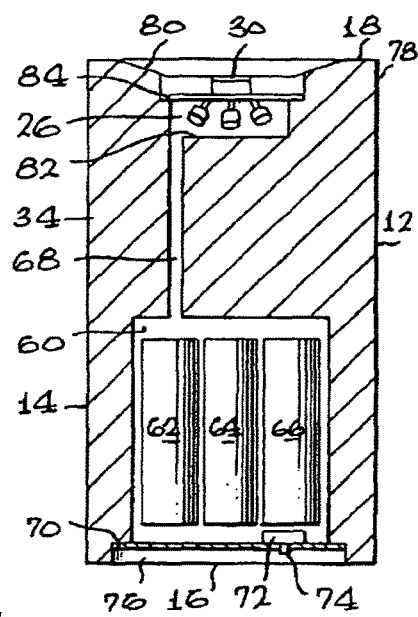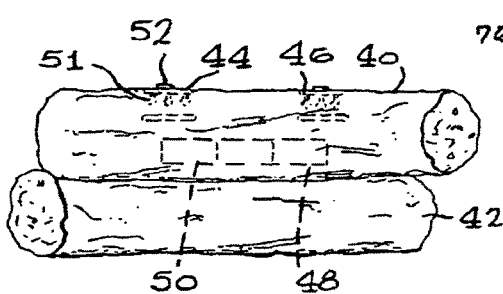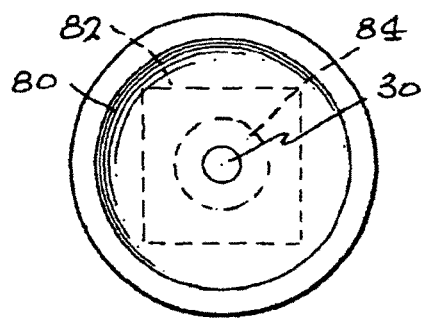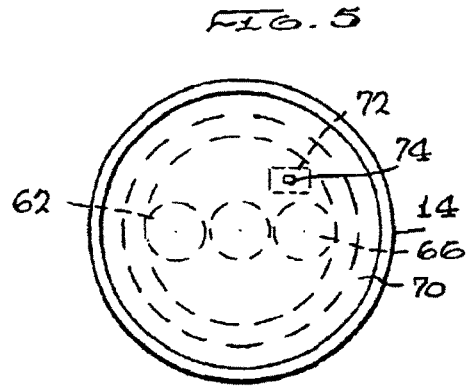

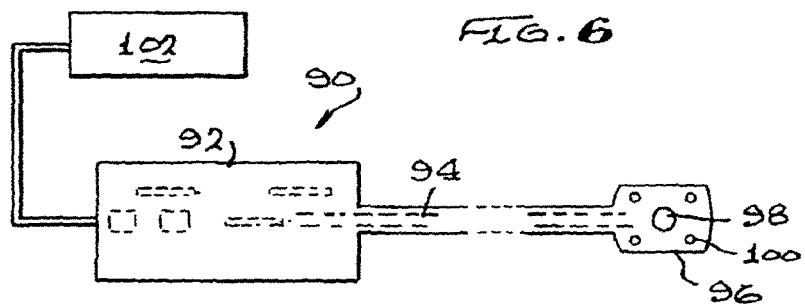
FIG. 6
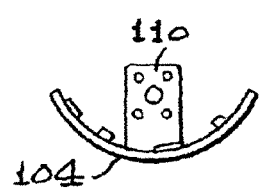
FIG. 8b
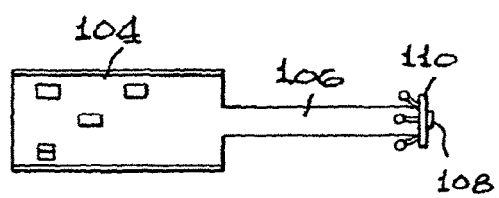
FIG. 8a
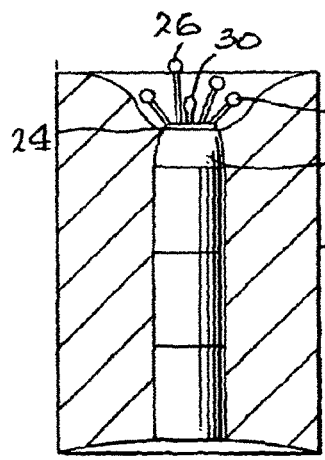
FIG. 9
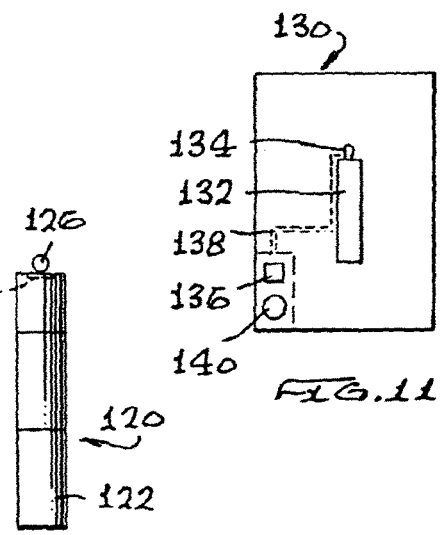
FIG. 10
FIG. 11

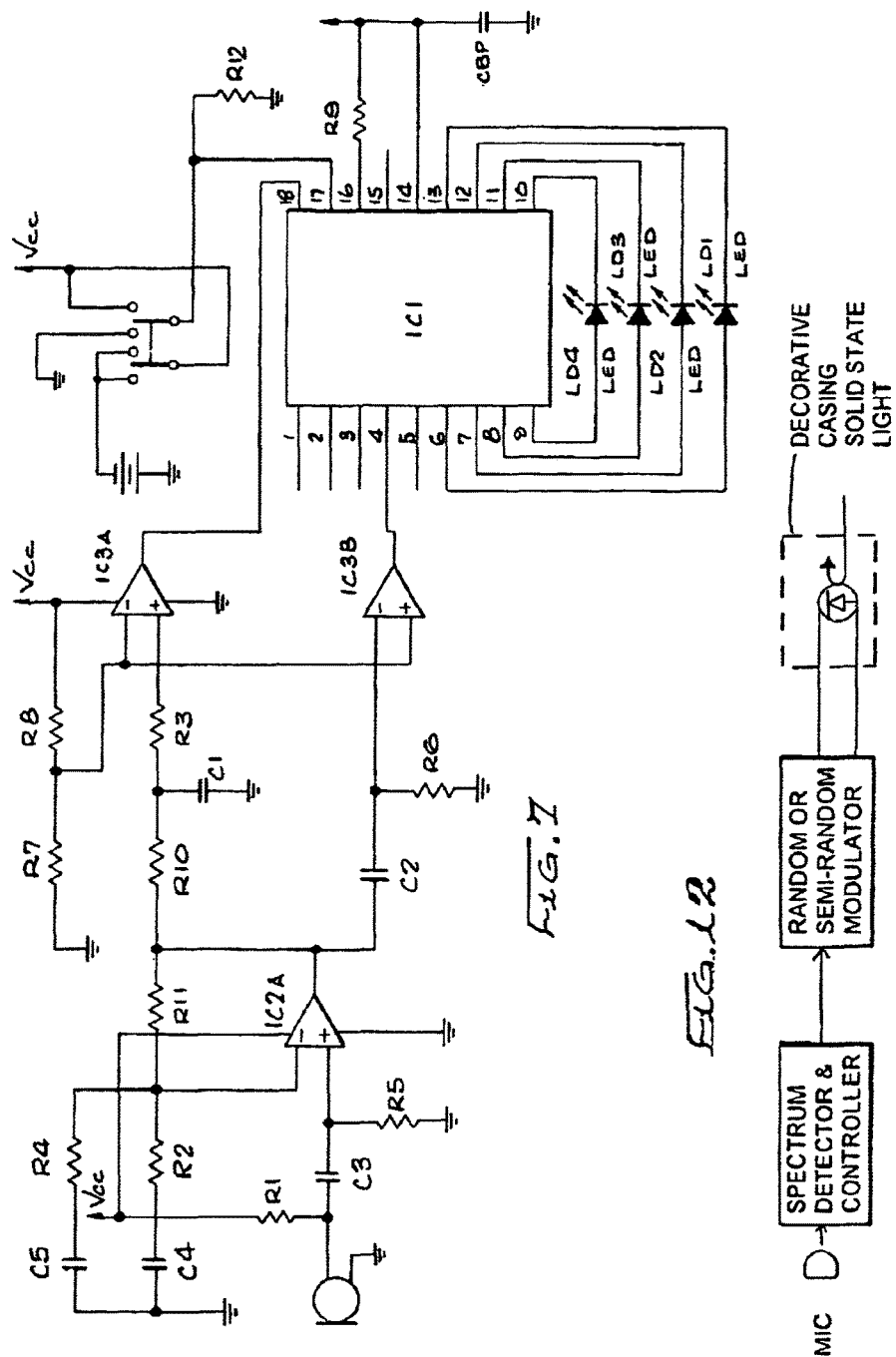

ELECTRICALLY ILLUMINATED FLAME SIMULATOR

RELATED APPLICATIONS

This application is a continuation of Ser. No. 15/346,475 filed Nov. 8, 2016, which is a continuation of Ser. No. 14/848,714 filed Sep. 9, 2015, now U.S. Pat. No. 9,491,832 issued Nov. 8, 2016, which is a continuation of Ser. No. 14/623,308 filed Feb. 16, 2015 (now abandoned), which is a continuation of U.S. application Ser. No. 14/055,544 filed Oct. 16, 2013, now U.S. Pat. No. 8,998,461, issued Apr. 7, 2015, which is a continuation of U.S. application Ser. No. 13/449,100 filed Apr. 17, 2012, now U.S. Pat. No. 8,562,186, issued Oct. 22, 2013, which is a continuation of U.S. application Ser. No. 12/927,645 filed Nov. 19, 2010, now U.S. Pat. No. 8,157,425, issued Apr. 17, 2012, which is a continuation of U.S. application Ser. No. 12/586,933 filed Sep. 30, 2009, (now abandoned), which is a continuation of U.S. application Ser. No. 12/284,986 filed Sep. 26, 2008 (now abandoned), which is a continuation of U.S. application Ser. No. 11/881,303, filed Jul. 26, 2007 (now abandoned), which is a continuation of U.S. application Ser. No. 11/494,812 filed Jul. 28, 2006 (now abandoned), which is a continuation of U.S. application Ser. No. 10/822,392 filed Apr. 12, 2004 (now abandoned), which is a continuation of U.S. application Ser. No. 10/084,272 filed Feb. 27, 2002, now U.S. Pat. No. 6,719,443, issued Apr. 13, 2004, all of which are incorporated herein by reference in their entirety. This application is also related to U.S. application Ser. No. 14/152,430 filed on Jan. 10, 2014, now U.S. Pat. No. 8,858,043 issued Oct. 14, 2014, which is also a continuation of U.S. application Ser. No. 14/055,544.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This invention relates to an electrically illuminated flame simulator. Particularly, the invention relates to decorative candles, fire logs, or other devices which may be illuminated so as to produce a flickering flame effect. The flame simulator of the invention would typically be electrically powered by batteries, either disposable or rechargeable, but may also be powered through a regular AC outlet, with or without an AC adaptor.

Candles, fire logs, specially created street lights and other devices which may be used, for example, on clothing, cycles or other products are commonly available and valued for their effect. However, in many instances, where candles, fire logs or related lighting fixtures are used, the lighting produced is from a flame which may typically burn in an oil container, wax candle or the like. There are, of course, natural hazards associated with such a device, since they may result in fire accidents which, if unattended or not properly controlled, can produce extensive damage, smoke or pollution.

The invention therefore utilizes the concept of such decorative elements, but uses, instead of a flame, an electrically illuminated flame simulator which is programmed to operate so that, when observed, is shown to produce a light-flickering effect which is the same as or similar to a burning candle, fire log or the like. However, the invention is not limited to devices such as candles and fire logs, and the electrically illuminated flame simulator of the invention can be used in a wide array of products and conditions, such as in ornamental or decorative street lights, in clothing such as belts, shoes and caps, greeting cards, or on bicycles, scooters and the like. Furthermore, the flickering effect of the flame simulator of the invention may be used to advantage as a hazard warning, such as on road hazard or emergency automobile lights.

Certain devices and methods are known which may have the effect of producing or simulating a real flame. For example, a single specially designed, unstable neon light bulb may be used. Such unstable neon bulbs, however, inherently produce an unnatural "jerky" flickering pattern that may not be easily controlled electronically, and must be operated by high voltage sources. At the least, this makes them generally unsuitable for battery operation. A further example can be found in a single incandescent light bulb whose light output may be modulated by varying the output of an AC or DC voltage source. Such incandescent light bulbs, however, are inherently limited in terms of flickering rate and effect due to retention of filament heat, and draw substantially more current than solid state light sources such as LED lights. Once more, this is not generally suitable for battery operation, at the least.

Where multiple light bulbs each switched on and off may be used for display and decorative purposes, there is an absence of the illusion of light movement characteristic of a flickering flame since the light bulbs are not switched or modulated in a manner which would generate light motion typical of that produced by a real flame.

Linear arrays of "traveling" or "chaser" lights are also known but these arrays are structured and controlled to generate the effect of a large magnitude of light motion in a linear direction, which is coincident with the linear array of such lights. Certainly, the effect produced by these linear arrays does not mimic the illusion of a flickering flame.

BRIEF SUMMARY OF THE INVENTION

In one aspect, the invention is for an electrically illuminated flame simulator. Preferably, the flame simulator of the invention is associated with an ornamental or decorative device, or with other devices such as hazard indicators. In one form, the flame simulator of the invention may constitute a part of an ornament or decoration such as a candle, fire log, or an indoor or outdoor lighting display, giving the appearance that the ornament is providing a natural flame. Other such decorative uses may make the flame simulator of the invention useful when associated with clothing, such as on belts or caps, greeting cards, or when incorporated into shoes.

When used as a hazard warning, the flame simulator of the invention may be used in conjunction with cycles or cycle clothing, or with road barriers, signs for warning motorists or as emergency lighting for vehicles.

In a preferred form, the electrically illuminated flame simulator is used with a decorative candle. The candle itself may be comprised of wax or other conventional materials from which candles are produced, or materials such as plastics which can emulate the look of a candle. The flame simulator of the invention would preferably be located within the candle body so that the flame simulator, when illuminated, can be seen not only from the top of the candle, but also as a glow or source of light emanating from within the candle.

According to another aspect of the invention, the flame simulator may also be used to provide an effect similar to that of a candle when used in a fake fire log intended to produce the effect of a natural burning log.

In one form, the flame simulator of the invention comprises at least two light sources, preferably four, such as light bulbs, which may be randomly, sequentially, or semi-randomly illuminated to produce a flickering and moving light effect to resemble a real flame, for example a flame provided by a burning candle. The light sources are preferably light-emitting diodes (LEDs), randomly or semi-randomly illuminated electronically.

In another embodiment, the flame simulator of the invention comprises a single non-filament (solid state) light source, such as an LED light bulb, liquid crystal display, or electro luminescent material, in which such light source is driven by a randomly or semi-randomly modulated voltage source to provide a flickering effect to resemble a real flame.

Further, in another aspect of the invention, the illuminated source producing the flame-flickering effect may be operated (namely, activated and deactivated) by externally produced, preselected sounds. Therefore, the electrically illuminated flame simulator of the invention may have associated therewith a microphone integrated as part of the electronics, so that sounds or different frequencies may be programed to produce a given result, such as the switching on or switching off of the flame simulator.

The flame simulator of the invention may also incorporate other features, including motion detectors, light sensors and the like, so that any ornament or decoration incorporating the flame simulator of the invention will operate automatically, for example, when ambient light conditions reach a certain level, and/or when movement is detected within a specific range.

According to one aspect of the invention, there is provided an electrically powered flame simulator comprising: at least two light sources; an integrated circuit electrically connected to the light sources for intermittently, such as systematically, randomly or semi-randomly, illuminating at least one of the light sources independently of other light sources such that the light sources together provide the effect of a flickering movement; and a power source for providing power to the integrated circuit. Preferably, the a flame simulator comprises at least four light sources.

The flame simulator preferably includes a switch means for activating and deactivating the integrated circuit. The switch means may have three positions comprising an on position, an off position, and an on-timed position where the flame simulator will remain activated for a predetermined length of time.

The flame simulator may further comprise a microphone connected to the integrated circuit wherein the microphone inputs preselected audio signals which are processed by the integrated circuit to switch the flame simulator between an on position, an off position, and an on-timed position where the flame simulator will remain activated for a predetermined length of time. Preferably, the integrated circuit processes signals from the microphone having a higher frequency, such as those produced by a finger snap, to place the flame simulator in the on position and processes lower frequency signals, such as those produced by blowing, to place the flame simulator in the off position.

The integrated circuit may illuminate the light sources in a random or semi-random operation, in a preselected, predetermined operation, and may function only when selected ambient sound or light conditions are present.

In one form, the flame simulator comprises a body in the shape of a candle in which the flame simulator is contained, the body having an upper end with a mounting means for receiving the integrated circuit and light sources and a chamber therein for receiving the power source.

Preferably, the light sources are light emitting diodes (LEDs). The integrated circuit may be mounted on a rigid base, or on a flexible base which can be shaped so as to conform to the shape of at least a portion of the candle to conserve space.

According to another aspect of the invention, there is provided a candle having an electrically powered flame simulator comprising: a candle body having an upper portion, a lower portion and a chamber therein; and a flame simulator having at least two light sources located near the upper portion of the candle body, an integrated circuit within the candle body and electrically connected to the light sources for intermittently, such as by randomly or semi-randomly, illuminating at least one of the light sources independently of other light sources such that the light sources together provide the effect of a flickering movement, and a power source in the chamber of the candle body for providing power to the integrated circuit.

BRIEF DESCRIPTION OF SEVERAL VIEWS OF THE DRAWINGS

FIG. 1 is a schematic side view of a candle with the electrically illuminated flame simulator of the invention;

FIG. 2 is a front view of artificial fire logs incorporating a flame simulator of the invention;

FIG. 3 is a schematic side view, showing various components, of an artificial candle with flame simulator of the invention;

FIG. 4 is a top view of the candle shown in FIG. 3 of the drawings;

FIG. 5 is a bottom view of the candle shown in FIG. 3 of the drawings;

FIG. 6 is a schematic view of the flame simulator of the invention, shown independent of any decorative ornament with which it may be associated;

FIG. 7 is a circuit diagram showing the electronics in one embodiment of the flame simulator of the invention;

FIGS. 8a and 8b show another embodiment of the flame simulator of the invention standing alone, shown as a front view and top view respectively;

FIG. 9 shows a schematic side view of a candle with the electrically illuminated flame simulator of the invention as illustrated in FIG. 1, but with LED light sources which face upwards;

FIG. 10 shows schematically a single "birthday" type candle in accordance with the present invention; and FIG. 11 shows schematically a greeting card in accordance with the present invention; and FIG. 12 shows a block diagram of one embodiment of a single light source flame simulator of the invention.

DETAILED DESCRIPTION OF THE INVENTION

The invention is for a flame simulator which is powered electrically, and comprises a series of bulbs or LEDs which are illuminated randomly, semi-randomly or in a predetermined a manner to provide the visual effect of a flickering flame. The device is preferably coupled to an ornament such as a candle or fire log to enhance this effect.

FIG. 1 of the drawings shows schematically a candle 12, generally of cylindrical shape having side wall 14, a base 16, and a top surface 18. The candle 12 comprises a hollowed out central portion 20, generally extending between the top surface 18 and the base 16, which, in the embodiment of FIG. 1, may accommodate a power source such as batteries 22. Near the top surface 18 there is located circuitry 24, the circuitry 24 being connected to LED light sources 26, four of which are shown in the embodiment in FIG. 1 of the drawings. The LED light sources 26 open into a chamber 28, generally formed between the top of the batteries 22 and the undersurface of the circuitry 24. In a variation, the LED light sources 26 may point upwardly.

The circuitry 24 further comprises a microphone 30, at least a portion of which is exposed and not embedded within the candle 12. The microphone 30 has an operative portion thereof exposed to the outside air and is capable of receiving and processing signals of various frequencies, as will be described, which are transmitted to and then processed by the circuitry 24, to activate the LED light sources 26 to provide a flickering flame effect.

At the lower end of the hollow central portion 20, electrical pins 32 are located, and these may be connectable to an electric source (not shown). Such pins 32 may be used for different purposes, such as for recharging the batteries 22 when they are of rechargeable type, or for providing power directly to the circuitry 24 and the LED light sources 26. The batteries could, of course, be disposable, and, in a further variation, the candle 12 would be able to accommodate both disposable and rechargeable batteries.

Preferably, the candle 12 is cylindrically shaped, and may be comprised of wax or a synthetic material which provides a candle-like appearance. The candle 12 may be of desired color or a combination of colors, and may be translucent or opaque. The material of the candle 12 is chosen, and its thickness selected, so that the possibility exists for light from the LED light sources 26 to be viewed not only from the top surface 18 of the candle 12, but also through the body 34 of the candle, possibly in a muted or semi-transparent manner to provide a glowing effect.

As will be described below, the LED light sources 26 may be illuminated randomly, semi-randomly, or in a predetermined pattern. However, the overall purpose of illuminating the LED light sources 26 is to do so in such a way that the modulated illumination of each of the LED light sources provides an aesthetic flickering effect when illuminated in combination with the other LED light sources being similarly illuminated, so that the light and movement produced thereby emulates a natural candle flame.

With reference to FIG. 2 of the drawings, there is shown a pair of synthetic fire logs 40 and 42, which may be comprised of conventional materials known to those skilled in the art, and having ornamentation and design features thereon which look like real fire logs. In FIG. 2, which shows only one embodiment of the invention, the fire log 40 has two electric circuits 44 and 46, both of which are substantially identical to each other, and each of which may be powered by battery power source 48. An AC power source may be utilized in an alternative embodiment. The battery power source 48 is preferably contained within a specially hollowed out portion 50 of the fire log 40, and is placed electrically in contact with the circuitry 44 and/or 46 in a conventional manner, not shown in FIG. 2.

Associated with each of the electrical circuits 44 and 46 is a series of LED light sources 51. Each of the electrical circuits 44 and 46 may also include a microphone 52. The electrical circuits 44 and 46, together with their associated LED light sources 51 and microphone 52, operate in essentially the same manner as described with reference to FIG. 1 of the drawings. Thus, each of the LED light sources 51 in the array is activated to illuminate in a random or predetermined manner, so as to give off light at various points along the fire log 40 to provide the effect that the fire log 40 is glowing, or that flames are burning thereon.

Reference is now made to FIG. 3 of the drawings which shows, in side view, a diagrammatic representation of one embodiment of an ornamental candle incorporating the flame simulator of the invention. Where applicable, reference numerals will be used corresponding to those in FIG. 1 of the drawings. In FIG. 3, the candle 12 comprises side wall 14, a base 16, and a top wall 18. These various walls of the candle 12 define a candle body 34.

In the lower half of the candle 12, there is formed a hollow chamber 60 adapted to receive three batteries 62, 64 and 66, which form a battery or power pack. The chamber 60, at an upper portion thereof, leads into a wire channel 68 extending therefrom towards the circuits and light sources above, which will be described.

The chamber 60 is accessed through a removable cover plate 70 near the base 16 of the candle. The batteries 62, 64 and 66 are connected to a power switch 72, contained within the chamber 60, the power switch 72 having a switch lever 74 which extends from within the chamber 60 to outside of the candle 12, through the cover plate 70. In this way, the user has manual access to and control of the switch lever 74 for activating or deactivating the candle 12.

At the base 16 of the candle 12, there is a recessed portion 76, the recessed portion 76 leading to the chamber 60, but, in normal usage, sealed from the chamber 60 by means of the cover plate 70.

At the upper end 78 of the candle 12, there is an upper recess 80 leading into a LED chamber 82. A printed circuit board 84 or an integrated circuit mounted on a board 84 houses the electronics, one embodiment of which is described below, for activating the candle 12. Attached to the PC board 84 are four LED light sources 26, which extend from the PC board 84 into the LED chamber 82. A microphone 30 extends upwardly from the PC board 84, into the upper recess 80. The PC board 84 is electrically connected to the power source of batteries 62, 64 and 66 through appropriate electrical connectors which extend though the wire channel 68.

FIG. 6 shows, schematically, a flame simulator 90 independent of the body or ornament on which it may be mounted, including an integrated circuit 92, an arm 94 extending therefrom which supports or contains conductors, preferably flexible conductors, and a support plate 96 at the end of arm 94 which can be arranged at an angle to the arm 94, as required. The support plate 96 includes a microphone 98 and LEDs 100. The integrated circuit 92 is powered by a power source, indicated generally at 102.

With reference to FIG. 7 of the drawings a preferred circuit diagram showing some of the electronics and operation of the equipment is described.

The heart of the system is the integrated circuit IC1 connected to a number of LEDs, LD1-LD4. IC1 systematically or randomly or semi-randomly, at the designer's choice, turns on and off the LEDs simulating the flickering of the candle 12.

Power is applied to all electronic circuitry, where indicated by "VCC", by operation of a switch S1. The switch S1 has three positions: "on"; "off"; and "timed". In the "on"

position of switch S1, the integrated circuit IC1 operates in a continuous mode after enablement, and stops only when commanded to do so by the user. That is, in this mode, operation starts and stops under remote control by the user, as explained below. In the "off" position of switch S1, the entire system is shut down, since switch S1 disconnects the battery from VCC. In the "timed" position of the switch S1, after starting operation, the integrated circuit IC1 stops operation automatically after a predetermined time has passed.

In the "on" position of switch S1, typically at least 3 volts (2×1.5V) from the batteries is routed through the switch S1 and applied to all circuitry requiring VCC. All circuit points designated "GND" are connected together representing ground potential for the system. Ground potential (GND) is not switched by the switch S1, except in the "on" position of the switch S1, when GND is applied to a pin 17 of the IC1 to set the functional operation of the IC1 in a continuous mode of operation until a "stop" signal is received on the pin 18 to cease its operation. In the "timed" position of S1, VCC is applied to the pin 17 of the IC1, causing an internal timer in the IC1 to time out and stop operation of the IC1 after a predetermined delay time, e.g., three hours.

In the "on" position of the switch S1, all circuits are powered and in a standby mode, defining an initial quiescent state for the IC1 in which none of the LEDs LD1-LD4 are lit. However, upon the occurrence of a high frequency sound at the microphone MIC1, such as a hand clap or finger snap, a signal is generated at the output of the microphone MIC1 and applied to the + terminal of an operational amplifier IC2A. The IC2A amplifies the sharp sound sensed by the microphone MIC1, and applies the amplified output signal simultaneously to the + input of an IC3A and to the − input of the IC3B, which enables IC1 to begin modulating the LEDs to produce the flickering effect. The circuit may be modified to respond to different frequency signals without altering the principles of the present invention.

R1, C3, R5; C4, C5, R2, R4; R11; and R7, R8 are coupling, frequency compensation, feedback, and biasing components, the functions and operations of which are familiar to a skilled worker and therefore need not be further described in detail herein. C2 and R6 define a high-pass filter, while R10, C1, and R3 define a low-pass filter arrangement.

In the presence of a sharp, high frequency sound input to the microphone MIC1, high frequency signal components are present at the output of the IC2A, which signal components are passed on only to the − terminal of the IC3B through the high-pass filter C2, R6, i.e., the high frequency signal from the IC2A is blocked from reaching the + terminal of the IC3A due to the presence of the low-pass filter R10, C1, R3.

Thus, the IC3B amplifies its input signal and sends it to a pin 4 of the IC1 as a "start" pulse, initiating the operation of the IC1. When in an operational mode, the IC1, either systematically (e.g., sequentially) or randomly, applies power sufficient to light the LEDs LD1-LD4 individually via pins 6 and 13 for LD1, via pins 7 and 12 for LD2, via pins 8 and 11 for LD3, and via pins 9 and 10 for LD4.

In the "on" switch setting, this condition will continue until the switch S1 is moved to the "off" position, or until a low frequency sound, such as that made by blowing or making a thud-like sound near the microphone MIC1, is sensed by the microphone MIC1.

In the presence of a low frequency sound input to the microphone MIC1, low frequency signal components are present at the output of the IC2A, which signal components are passed on only to the + terminal of the IC3A through the low-pass filter R10, C1, R3, i.e., the low frequency signal from the IC2A is blocked from reaching the − terminal of the IC3B due to the presence of high-pass filter C2, R6.

Thus, the IC3A amplifies its input signal and sends it to a pin 18 of the IC1 as a "stop" pulse, ceasing the operation of the IC1, at which time, the circuitry is again returned to its quiescent state awaiting another high frequency sound in the vicinity of the microphone MIC1. As previously explained, other frequency sounds may be selected to control various functions including on and off functions.

When the switch S1 is moved to the "timed" position, starting the operation of the IC1 is accomplished in the same manner as described above, i.e., by the sensing of a high frequency sound present at the microphone MIC1. However, in the "timed" mode, VCC is applied to the pin 17 of the IC1 through the switch S1. This VCC potential on the pin 17 sets an internal timer to run for the aforementioned predetermined delay time, after which the operation of the IC1 is automatically terminated, and the circuitry is again returned to its quiescent state awaiting another high frequency sound in the vicinity of the microphone MIC1.

It is to be understood that the circuit diagram of FIG. 7 depicts a preferred embodiment for the electronics of the invention, and that other functions may be employed by either reconfiguring the connections to the IC1 and/or by the use of additional, or other, electronic components. Examples of variations of the described circuit would be apparent to a person of ordinary skill in the art. For example, the switch S1 could be modified, or a separate switch could be provided, to operate a modified electronic system in yet another mode in which the microphone MIC1 is disconnected from the system, and starting and stopping operation of the IC1 is accomplished solely by manual control. As another example, the delay for a timed stop could be made selectable with only minor modification of the circuit diagram and the provision of a manual delay time control device.

In FIGS. 8a and 8b there is shown a further embodiment of a circuit board 104, which is arcuate in order to conform with the shape of a battery around which it may be located as a space-saving technique. An arm 106 (or simply wires which are flexible and may be in flexible tubing) preferably extends upwardly or away from the printed circuit board and circuitry 104, and terminates in a support plate 110 substantially at right angles to the arm 106. The plate 110 supports the microphone 108 and LED light sources which would be located, in use, near the upper portion of a candle.

FIG. 9 shows a view of a candle very similar to that illustrated in FIG. 1 of the drawings, but with the light sources 26 pointing upwardly for a slightly different effect. FIG. 10 shows schematically a "birthday" type candle 120 having a battery area 122, a circuit 124 and an LED 126. LED 126 may be substituted by an alternative form of light without altering the principles of the present invention.

A greeting card 130 is illustrated in FIG. 11 and includes a printed candle 132 having an LED light source 134 thereabove which is operated by a circuit 136 to which it is connected by embedded wires 138. A power source 140 is also provided.

The circuit board may be comprised of a flexible material so that its shape can be easily manipulated to fit the space in which it is to be mounted. The circuit board can be connected to the LED light sources through any appropriate electrical connection means so that it can be distanced therefrom, and this also functions as a space-saving technique for confining and mounting the electronics into smaller spaces.

In a preferred embodiment of the invention, there are at least two light bulbs, although more (such as four) are preferable, powered by randomly or sequentially generated voltage sources to produce the flickering effect. In a preferred embodiment, at least two pairs of output ports of a micro-controller may be programmed to provide a seven-segment LED/LCD 12-hour time clock multiplex function. An audio signal is processed, in one embodiment, by a high-frequency filtering circuit, the output of which provides a power-on signal which is responsive to a finger snap, handclap or the like, as described with reference to FIG. 7. Further, the audio signal may be processed by a low-frequency filtering circuit, the output of which provides a power-off signal, which is responsive to, for example, a blowing sound.

A mode switch or remote control device may be employed to select between the modes of power-off, power-on or power-on with various microphone functions, or power-on for a predetermined period of time.

Another preferred feature of the invention may include the use of LED-type light bulbs, generally in the manner described above, wherein such light bulbs radiate light in a non-parallel and substantially downward direction, so as to illuminate a translucent candle body, as briefly referenced in the description of FIG. 1 of the drawings. Incandescent or neon light bulbs may substitute one or more of the LED light bulbs, and non-micro controller circuitry may be used.

The two light bulbs may be operated by at least two voltage sources, where a voltage source is randomly generated, semi-randomly generated, or sequentially generated, thereby producing the flickering flame and moving light effect.

The flame simulator of the invention may have a signal produced by a microphone and microphone amplifier which triggers the modulated voltage sources into power on and power off states alternately. Frequency equalization may be applied to the amplifier such as to favor high frequency sounds (such as a finger snap or hand clap) in triggering the power on state, and the frequency equalization may also be applied to the amplifier such as to favor low frequency sounds (such as blowing air) in triggering the power off state. Preferably, at least one of the light bulbs radiates light into or from a translucent candle body, and any two such light bulbs may radiate light in directions that are parallel or non-parallel to one another.

The invention is not limited to the precise details, and variations of the particular electronics and circuitry, as well as the ornaments or devices to which they may be attached, may vary within the disclosure herein. Further, additional features may form part of the invention. For example, a light sensor device may be associated and electrically connected to the circuitry of the invention. The light sensor senses the level of ambient light and may switch on the flame simulator, or place it in a mode receptive to audio signals as described above, only when light levels drop below a pre-selected intensity. In this way, the flame simulator of the invention would only operate during darker periods or in darker environments.

The invention may also include a motion detector associated therewith and electrically connected with the circuitry of the flame simulator of the invention. The inclusion of motion detector sensors would confine operation of the flame simulator of the invention to periods of time when movement, such as that made by people in the vicinity, is present and thereby save power by in operation when motion is not detected. Another option would be to incorporate heat sensors to restrict operation of the flame simulator to conditions when temperatures drop below or move above preselected levels.

The invention claimed is:

1. A flameless candle having an electrically powered flame simulator, the flameless candle comprising:
   a substantially cylindrical body having permanent exterior surfaces comprising an upper portion having a rim on an upper surface that circumscribes a recess, a lower portion with a lower surface, and at least one chamber within the cylindrical body below the recess, wherein the substantially cylindrical body is self-supporting on the lower surface;
   a flame simulator comprising at least one light source, wherein the at least one light source is located within the at least one chamber and in an upper region of the candle;
   a circuit electrically connected to the flame simulator configured to illuminate the flame simulator;
   a power source housed in the at least one chamber and configured to provide power to the circuit; and
   a protruding component extending upwardly from the recess, wherein light emanating from the at least one light source projects onto the protruding component.

2. The flameless candle of claim 1, wherein the at least one light source is pointed upwardly.

3. The flameless candle of claim 1, further comprising an ON/OFF/TIMER switch, wherein the circuit controls the at least one light source for a pre-determined period of time when the switch is set to the TIMER position.

4. The flameless candle of claim 1, wherein the at least one light source comprises a plurality of light sources.

5. The flameless candle of claim 4, wherein the circuit is configured to illuminate the at least one light source so as to cause a flickering effect.

6. The flameless candle of claim 5, wherein the circuit is configured to illuminate at least one of the plurality of light sources independently of at least one other one of the plurality of light sources.

7. The flameless candle of claim 1, wherein the circuit is configured to illuminate the at least one light source so as to cause a flickering effect.

8. The flameless candle of claim 1, further comprising a microphone associated with the circuit, wherein the circuit is further configured to process audio sounds received by the microphone.

9. The flameless candle of claim 8, wherein the circuit is further configured to control the at least one light source in response to processing the audio sounds.

10. The flameless candle of claim 1, further comprising a motion detector configured to control the at least one light source in response to a detection of motion.

* * * * *